(12) United States Patent
Hiraishi

(10) Patent No.: US 6,172,728 B1
(45) Date of Patent: Jan. 9, 2001

(54) REFLECTIVE LCD INCLUDING ADDRESS LINES SHAPED TO REDUCE PARASITIC CAPACITANCE

(75) Inventor: Youichi Hiraishi, Tenri (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/017,807

(22) Filed: Feb. 3, 1998

(30) Foreign Application Priority Data

Feb. 7, 1997 (JP) .................................................... 9-024201

(51) Int. Cl.$^7$ .................................................. G02F 1/1343
(52) U.S. Cl. ............................ 349/139; 349/39; 349/145
(58) Field of Search ............................... 349/39, 139, 145

(56) References Cited

U.S. PATENT DOCUMENTS

| | | | |
|---|---|---|---|
| 5,159,476 | * 10/1992 | Hayashi | 359/54 |
| 5,610,739 | * 3/1997 | Uno et al. | 349/39 |
| 5,790,222 | * 8/1998 | Kim | 349/139 |
| 5,796,448 | * 8/1998 | Kim | 349/39 |
| 5,886,756 | * 3/1999 | Lee | 349/39 |
| 5,943,106 | * 8/1999 | Sukenori et al. | 349/39 |
| 5,946,065 | * 8/1999 | Tagusa et al. | 349/138 |
| 5,966,189 | * 10/1999 | Matsuo | 349/38 |
| 5,966,193 | * 10/1999 | Zhang et al. | 349/110 |
| 5,999,234 | * 12/1999 | Budd et al. | 349/38 |
| 6,001,517 | * 12/1999 | Kawamonzen | 430/18 |
| 6,011,600 | * 1/2000 | Kamada et al. | 349/44 |
| 6,040,882 | * 3/2000 | Jun et al. | 349/39 |

FOREIGN PATENT DOCUMENTS 7-159776   6/1995   (JP) .

* cited by examiner

Primary Examiner—William L. Sikes
Assistant Examiner—Tarifur R. Chowdhury
(74) Attorney, Agent, or Firm—Nixon & Vanderhye P.C.

(57) ABSTRACT

A reflective liquid crystal display device according to the present invention includes: a plurality of scanning lines; a plurality of signal lines disposed so as to intersect with the plurality of scanning lines; a plurality of pixel electrodes which also serve as reflective plates and which overlap at least one of the scanning lines and the signal lines via an interlayer insulating film; and a plurality of switching elements for driving the pixel electrodes, each provided in a vicinity of the intersection of the scanning lines and the signal lines. At least one of the scanning lines or the signal lines have at least one of bends, notches, protrusions and holes.

10 Claims, 13 Drawing Sheets

REFLECTIVE LCD INCLUDING ADDRESS LINES SHAPED TO REDUCE PARASITIC CAPACITANCE

BACKGROUND OF THE INVENTION

1. Field of the Invention

The present invention relates to an active matrix reflective liquid crystal display device with switching elements such as thin film transistors (hereinafter simply referred to as "TFTs"). More specifically, the present invention relates to a reflective liquid crystal display device characterized by the shapes of its scanning lines, signal lines and pixel electrodes, and a method for producing the liquid crystal display device.

2. Description of the Related Art

Reflective liquid crystal display devices perform a display function by reflecting externally incident light. Since the reflective liquid crystal display devices require low consumption power and are able to provide thin displays for lightweight products, they are recently receiving much attention, for example, for use in displays of portable information terminals such as PDAs (Personal Digital Assistants).

Reflective plates of the reflective liquid crystal display device, which also serve as pixel electrodes, are flat. The flat mirror surfaces of the reflective plates may undesirably reflect objects close to the display, may cause the display to be easily affected by external scattered light, or may cause nonuniform wavelength characteristics of the reflected light due to diffraction or interference which results in coloring of the reflected light, thereby deteriorating the display quality of the device. In order to enhance the display quality of the device under the sunlight or under any kind of indoor light, Japanese Laid-Open Publication No. 7-159776 discloses a technique for providing reflective plates with uneven surfaces.

FIG. 12 is a partial plan view showing an active matrix substrate used in the reflective liquid crystal display device disclosed in the above-mentioned publication.

Referring to FIG. 12, the active matrix substrate includes a plurality of pixel electrodes 54 made of a metal material with a high reflectance provided in a matrix on a base substrate 60 (FIG. 13). Gate lines 52 and source lines 53 run in an intersecting manner so as to surround each of the pixel electrodes 54. At each intersection of the gate lines 52 and the source lines 53, a TFT 51 is provided as a switching element connected to the pixel electrode 54. Each gate electrode 62 (FIG. 13) of each TFT 51 is connected to the corresponding gate lines 52 so that the TFTs 51 are driven and controlled by signals input to the gate electrodes 62 (FIG. 13). Each source electrode 63 (FIG. 13) of each TFT 51 is connected to the corresponding source line 53 so that data signals input to the source electrodes 63 (FIG. 13) are applied to the pixel electrodes 54 via the TFTs 51. Lattice-like storage capacitor lines 55 (hereinafter, simply referred to as Cs lines 55) are disposed beneath the pixel electrodes 54 via a gate insulating film 57 (FIG. 13), thereby forming storage capacitors. The Cs lines 55 are provided with holes 55a, whereby the surfaces of the pixel electrodes 54 are made uneven.

FIG. 13 is a cross-sectional view showing one pixel portion of the reflective liquid crystal display device using the active matrix substrate shown in FIG. 12, taken along line E–E'.

With reference to FIG. 13, the gate electrode 62 protruding from the gate line 52 (FIG. 12) is provided on the base substrate 60. The gate insulating film 57 is formed so as to cover the gate electrode 62. A semiconductor layer 65 and n$^+$Si layers 67 and 68 are formed on the gate insulating film 57. On the thus-obtained layers, the source electrode 63 protruding from the above-described source line 53 and a drain electrode 64 which is integrated with the pixel electrode 54 are formed.

Still referring to FIG. 13, a counter electrode 71 is formed on a counter substrate 70 so as to face the pixel electrode 54. A shielding film 73 is provided so as to face the TFT 51. The base substrate 60 and the counter substrate 70 with alignment films (not shown) are disposed in an opposing manner with a liquid crystal layer 80 interposed therebetween, thereby forming a liquid crystal display device. If necessary, a color filter may be provided where the counter electrode 71 is provided. As can be seen from FIGS. 12 and 13, since holes 55a are provided through the Cs electrode 55, the surface of the pixel electrode 54 which is formed thereon via the gate insulating film 57 reflects the holes 55a and becomes uneven.

In order to enhance the use of light efficiency of the liquid crystal display device shown in FIG. 13, the pixel electrode 54 needs to be placed as close to the gate line 52 and the source line 53 as possible, and be made as large as possible. However, at a portion where the pixel electrode 54 is close to the gate line 52 and the source line 53, a transverse electric field may cause reverse tilted domains within the liquid crystal material which leads to poor display quality, or may cause a frequent leakage failure.

The pixel electrode 54 and the source line 53 are formed so as to overlap the gate line 52 via the insulating film 57 in order to minimize the effects caused by the above-described problems. In this case, parasitic capacitance may occur at the overlapping portion of the gate line 52 with the source line 53 and the pixel electrode 54, thereby inducing display defects caused by, for example, cross-talk. Moreover, since the periphery of the pixel electrode 54 is straight, the display quality may be deteriorated (e.g., coloring of the reflected light) due to nonuniform wavelength characteristics of the device caused by light interference.

SUMMARY OF THE INVENTION

According to one aspect of the present invention, a reflective liquid crystal display device includes: a plurality of scanning lines; a plurality of signal lines disposed so as to intersect with the plurality of scanning lines; a plurality of pixel electrodes which also serve as reflective plates and which overlap at least one of the scanning lines and the signal lines via an interlayer insulating film; and a plurality of switching elements for driving the pixel electrodes, each provided in a vicinity of the intersection of the scanning lines and the signal lines. At least one of the scanning lines or the signal lines have at least one of bends, notches, protrusions and holes.

Accordingly, the parasitic capacitance between the lines and the pixels is reduced, thereby preventing deterioration of the display quality caused by, for example, cross-talk. By randomly patterning the signal lines, the parasitic capacitance caused between the signal lines and the pixel electrodes may be slightly different for each pixel. Thus, display unevenness caused by the offset of blocks for stepper exposures is prevented. Moreover, the nonuniform wavelength characteristics at the periphery of the pixel electrodes are minimized, thereby eliminating the influence of the light interference.

In accordance with one embodiment of the present invention, the notches of at least one of the scanning lines or the signal lines are provided in an asymmetric manner with respect to a center line along a length of each of the scanning lines or the signal lines.

Accordingly, the widths of the scanning lines and the widths of the signal lines are maintained sufficiently wide for preventing discontinuities in the scanning lines and the signal lines.

In accordance with another embodiment of the present invention, a parasitic capacitance between each of the scanning lines and each of the pixel electrodes is substantially constant.

Accordingly, a direct-current component applied to the liquid crystal material is minimized, thereby enhancing the display quality and the reliability of the liquid crystal display device.

In accordance with still another embodiment of the present invention, island-shaped portions made of at least one of the materials used for the scanning lines or the signal lines are provided in areas where the scanning lines or the signal lines do not overlap the pixel electrodes.

In accordance with still yet another embodiment of the present invention, at least one of the scanning lines and the signal lines include a main line and a sub-line which are parallel and connected to each other, and the main line or the sub-line has at least one of bends, notches, protrusions or holes.

According to another aspect of the present invention, a method for producing a reflective liquid crystal display device includes: a plurality of scanning lines; a plurality of signal lines disposed so as to intersect with the plurality of scanning lines; a plurality of pixel electrodes which also serve as reflective plates and which overlap at least one of the scanning lines and the signal lines via an interlayer insulating film; and a plurality of switching elements for driving the pixel electrodes, each provided in a vicinity of the intersection of the scanning lines and the signal lines. The method includes a step of providing at least one of bends, notches, protrusions and holes to at least one of the scanning lines and the signal lines so as to make the surfaces of the pixel electrodes overlapping at least one of the scanning lines and the signal lines uneven.

Accordingly, a reflective liquid crystal display device having a bright display and sufficiently uniform wavelength characteristics at the periphery of the pixels is formed without increasing the number of production steps.

In accordance with one embodiment of the present invention, the surfaces of the pixel electrodes are made uneven by the interlayer insulating film which is exposed to light while using the scanning lines and the signal lines as masks.

Accordingly, a thick interlayer insulating film is formed between the pixel electrodes and the scanning lines or the signal lines, thereby minimizing the parasitic capacitance therebetween.

In accordance with another embodiment of the present invention, the interlayer insulating film is made of a positive type photosensitive resin.

Accordingly, the scanning lines and the signal lines act as light shielding films so as to leave the interlayer insulating film on the scanning lines and the signal lines after light exposure. Thus, a sufficient amount of the interlayer insulating film will remain between the pixel electrodes and the scanning lines or the signal lines, thereby reducing the parasitic capacitance therebetween and minimizing leakage failure.

In accordance with still another embodiment of the present invention, island-shaped portions made of at least one of the materials used for the scanning lines or the signal lines are provided in areas where the scanning lines or the signal lines do not overlap the pixel electrodes.

As a result, the interlayer insulating film follows the contours of these island-shaped portions. Thus, the surface of the interlayer insulating film is made uneven without different materials disturbing each other.

Thus, the invention described herein makes possible the advantages of: (1) providing a liquid crystal display device in which the light efficiency use is improved and parasitic capacitance is minimized, thereby preventing deterioration of display quality, and (2) providing a liquid crystal display device which is not effected, for example, by light interference at the peripheries of the pixel electrodes, thereby preventing deterioration of the display quality.

These and other advantages of the present invention will become apparent to those skilled in the art upon reading and understanding the following detailed description with reference to the accompanying figures.

DESCRIPTION OF THE PREFERRED EMBODIMENTS

Figure 1:
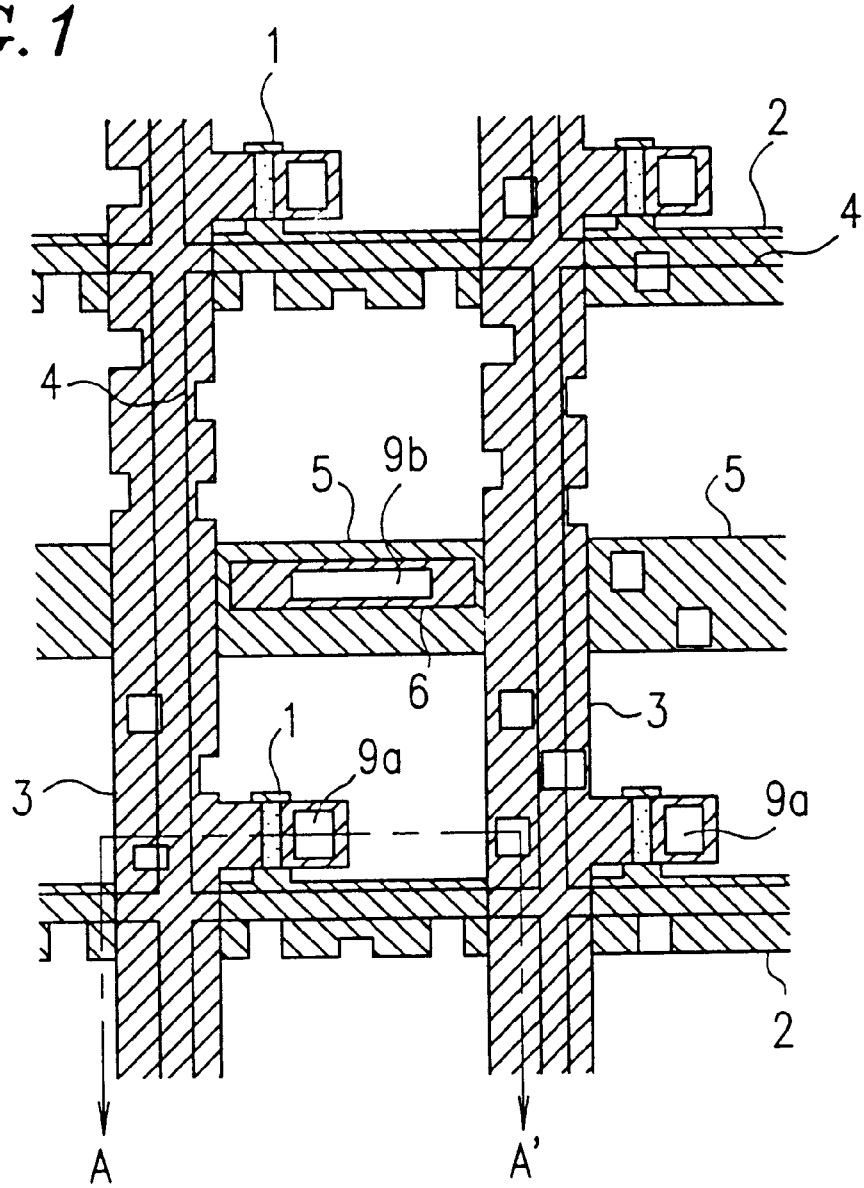
FIG. 1 is a plan view partially showing an active matrix substrate of a liquid crystal display device according to a first example of the present invention.

Hereinafter, the present invention will be described by way of illustrative examples with reference to the accompanying drawings. The same reference numerals designate the same components.

EXAMPLE 1

FIG. 1 is a plan view showing one pixel portion of an active matrix substrate of a liquid crystal display device according to a first example of the present invention.

Figure 2:
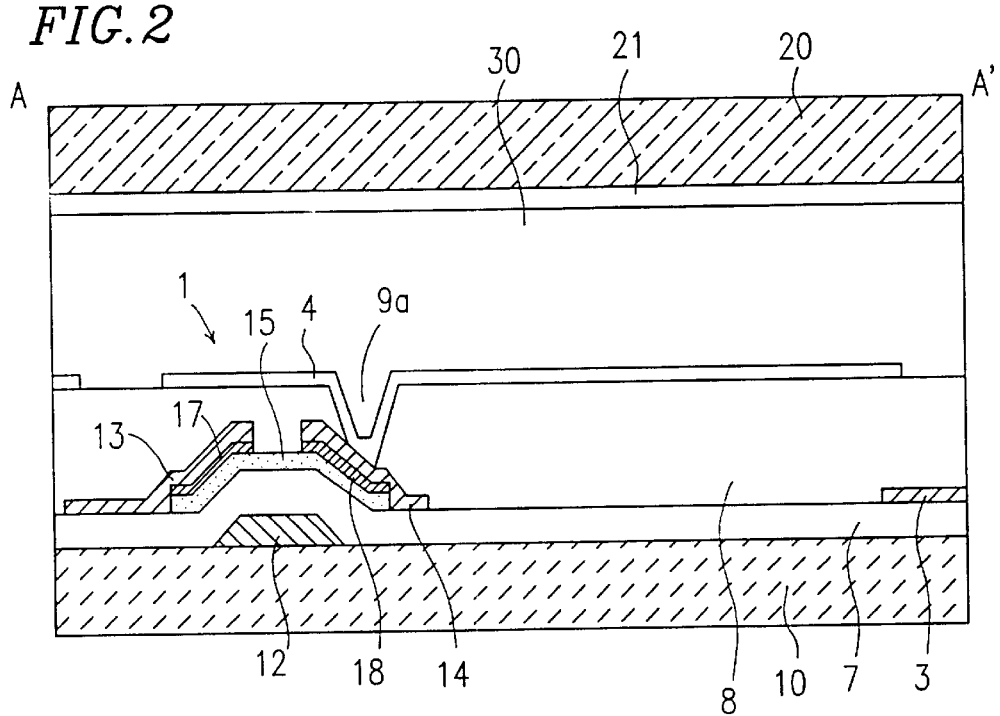
FIG. 2 is a cross-sectional view showing one pixel portion of the liquid crystal display device according to the first example of the present invention taken along line A–A' of FIG. 1.

FIG. 2 is a cross-sectional view showing the one pixel portion of the liquid crystal display device taken along line A–A' of FIG. 1.

Referring to FIG. 1, gate lines 2 are formed in parallel as scanning lines, and source lines 3 are formed in parallel as signal lines so as to cross with the gate lines 2. In the vicinity of the intersection of each gate line 2 and each source line 3, a TFT 1 is formed as a switching element via an insulating film such as a gate insulating film 7 (FIG. 2). An interlayer insulating film 8 (FIG. 2) is formed entirely over the TFT 1, the gate line 2 and the source line 3. A pixel electrode 4 is formed on the interlayer insulating film 8 so as to partially overlap the TFT 1, the gate lines 2 and the source lines 3. A Cs line 5 (FIG. 1) is simultaneously formed with the gate lines 2 and a storage capacitance electrode 6 (FIG. 1) is simultaneously formed with the source line 3, thereby forming a storage capacitance between the Cs line 5 and the storage capacitance electrode 6.

In the case of a conventional reflective liquid crystal display device, the gate lines and the source lines are formed in a linear manner so as to have substantially constant widths. However, when areas of the pixel electrodes are increased so as to improve the aperture ratio, the areas where the pixel electrodes overlap with the gate lines or the source lines increase, thereby increasing parasitic capacitance which may cause deterioration in display quality due to, for example, cross-talk. Moreover, when the gate lines and the source lines are made narrower in order to reduce the parasitic capacitance, resistance is increased which results in the potential for discontinuities during production of the device.

Therefore, according to the first example of the present invention, while the widths of the gate lines 2 and the source lines 3 are maintained substantially constant so as to minimize the resistance of the lines, the gate lines 2 and the source lines 3 are provided with a plurality of at least one of bends, notches, protrusions or holes or a combination thereof as shown in FIG. 1. As a result, the area where the pixel electrode 4 overlaps the gate lines 2 or the source lines 3 is reduced, thereby minimizing the parasitic capacitance.

In the case of the conventional linear source line with the substantially constant width, under the conditions where the line width of the source line is about 10 $\mu$m, the width where the source line and the pixel electrode overlap is about 3 $\mu$m, and the length of the pixel electrode is about 200 $\mu$m, the area where the source line and the pixel electrode overlap with each other will be approximately 200×3 $\mu$m$^2$.

On the other hand, according to the first example of the present invention, while the source line 3 has a substantially constant width, the area where the source line 3 and the pixel electrode 4 overlap is reduced in the areas where the bends, notches or holes are provided, thereby reducing the parasitic capacitance of the device. In addition, the overlapping area may also be reduced, by bending the source line 3 into a hook-like or a saw-like shape, thereby reducing the parasitic capacitance. The above-described effect also applies to the gate lines 2.

By providing the bends, notches or holes only at areas where the pixel electrodes 4 overlap the gate lines 2 or the source lines 3, unnecessary leakage of light to the gap between the pixel electrodes 4 and the gate lines 2 or the source lines 3 is prevented. The notches are preferably provided in an asymmetric manner with respect to the center line of the gate lines 2 or the source lines 3; otherwise, if the gate lines 2 or the source lines 3 are provided with symmetric notches, the gate lines 2 and the source lines 3 will be extremely narrow which may result in the potential for discontinuities during the production of the device.

The bends, notches, protrusions or holes are provided such that the parasitic capacitance formed between the gate line 2 and the pixel electrode 4 is relatively constant throughout every pixel of the liquid crystal display device. The parasitic capacitance is preferred to be relatively constant throughout every pixel of the liquid crystal display device to avoid the liquid crystal material from being affected by a direct-current component which is contained for a large amount in a voltage applied to the gate lines 2. The bends, notches, protrusions or holes are provided such that the parasitic capacitance formed between the source line 3 and the pixel electrode 4 varies within a certain degree in each pixel. By varying the parasitic capacitance, display unevenness at joints between blocks for stepper exposures caused by offset thereof is minimized.

Referring to FIG. 2, a gate electrode 12 protruding from the gate line 2 is formed on a transparent insulative substrate 10 made of, for example, glass. The gate electrode 12 is preferably made of tantalum, aluminum or the like having a thickness of about 350 nm by a sputtering method. The gate line 2 and the gate electrode 12 may be anodized so as to form an anodic oxide layer as a gate insulating film. Then, a gate insulating film 7 preferably made of silicon nitride or the like is formed on the substrate 10 with the gate line 2 and the gate electrode 12 having a thickness of about 400 nm by a plasma CVD method. A semiconductor layer 15 made of, for example, amorphous silicon (a-Si) is formed having a thickness of about 100 nm by a plasma CVD method on the gate insulating film 7 so as to overlap the gate electrode 12. A microcrystalline n-type silicon ($\mu$C-n$^+$Si) film is formed having a thickness of about 80 nm with the center portion thereof being divided, thereby forming ohmic contact layers 17 and 18, respectively on the semiconductor layer 15. A source electrode 13 preferably made of a tantalum, aluminum or the like is formed on the ohmic contact layer 17 having a thickness of about 80 nm so as to connect with the source line 3 shown in FIG. 1. A drain electrode 14 is formed on the ohmic contact layer 18 so as to connect with the pixel electrode 4. The display quality is enhanced by providing a low-reflective film preferably made of chromium oxide, tantalum nitride or the like on the gate lines 2 and the source lines 3.

A photosensitive acrylic resin is formed having a thickness of about 1 to 10 $\mu$m, for example, about 3 $\mu$m, as the interlayer insulating film 8 by a spin application method. The photosensitive acrylic resin is exposed to a desired pattern, developed with an alkali solution and cured with heat, so as to form a contact hole 9a for connecting the pixel electrode 4 with the drain electrode 14 and a contact hole 9b (FIG. 1) for connecting the pixel electrode 4 with the Cs electrode 6.

The photosensitive acrylic resin for the interlayer insulating film 8 preferably has a dielectric constant of about 3.4 to 3.5, which is lower than that of an inorganic film (e.g., a dielectric constant of a silicon nitride is about 8), has a high transparency and is easily formed into a film of about 3 $\mu$m by, for example, a spin application method. Accordingly, the parasitic capacitance between the gate line 2 and the pixel electrode 4 and the parasitic capacitance between the source line 3 and the pixel electrode 4 are minimized, thereby reducing the influence of the capacitance (e.g., cross-talk) on the display. Thus, an excellent and bright display is obtained. Furthermore, the photosensitive acrylic resin is advantageous in terms of productivity because a thin film of about a few micrometers may be formed by a spin application method and because patterning of a photosensitive acrylic resin requires no photoresist step.

The interlayer insulating film 8 is preferably made of a material with a low dielectric constant such as polyamideimide, polyarylate, polyetherimide, epoxy, polyimide (since the liquid crystal display device is of a reflective type, the interlayer insulating film 8 is not necessarily transparent).

Thereafter, a conductive film with high reflectance (e.g., aluminum) is formed as the pixel electrode 4 having a thickness of about 100 nm by a sputtering method. The pixel electrode 4 is connected to the drain electrode 14 of the TFT 1 via the contact hole 9a provided through the interlayer insulating film 8. Simultaneously, the pixel electrode 4 is connected to the Cs electrode 6 via the contact hole 9b. According to the first example of the present invention, the pixel electrode 4 is provided on the TFT 1 so as to also serve as a light shielding layer. Lastly, an alignment film (not shown) is formed. Consequently, the active matrix substrate according to the first example of the present invention is produced.

A counter substrate is obtained by forming a transparent conductive film such as an ITO (Indium Tin Oxide) film as a counter electrode 21 on a transparent insulating substrate 20 and then by forming an alignment film (not shown) thereon. At this point, color films may be provided as may be desired.

The thus-obtained active matrix substrate and the thus-obtained counter substrate are disposed in an opposing manner with a liquid crystal material 30 sealed therebetween, thereby forming the liquid crystal display device according to the first example of the present invention.

According to the first example of the present invention, the thick interlayer insulating film 8 with a low dielectric constant is provided between the gate line 2 or the source line 3 and the pixel electrode 4. The gate line 2 and the source line 3 are provided with a plurality of at least one of bends, notches, protrusions or holes, or a combination thereof. Therefore, the area where the pixel electrode 4 overlaps the gate line 2 or the source line 3 is reduced, thereby minimizing parasitic capacitance therebetween. As a result, display defects caused by, for example, cross-talk are prevented, thereby enhancing the display quality. The periphery of the pixel electrode 4 substantially follows the uneven contours of the bends, notches, protrusions or holes of the underlying gate lines 2 and source lines 3. By doing so, nonuniform wavelength characteristics caused by the light interference are prevented, thereby eliminating undesirable coloring of the reflected light.

EXAMPLE 2

Figure 3:
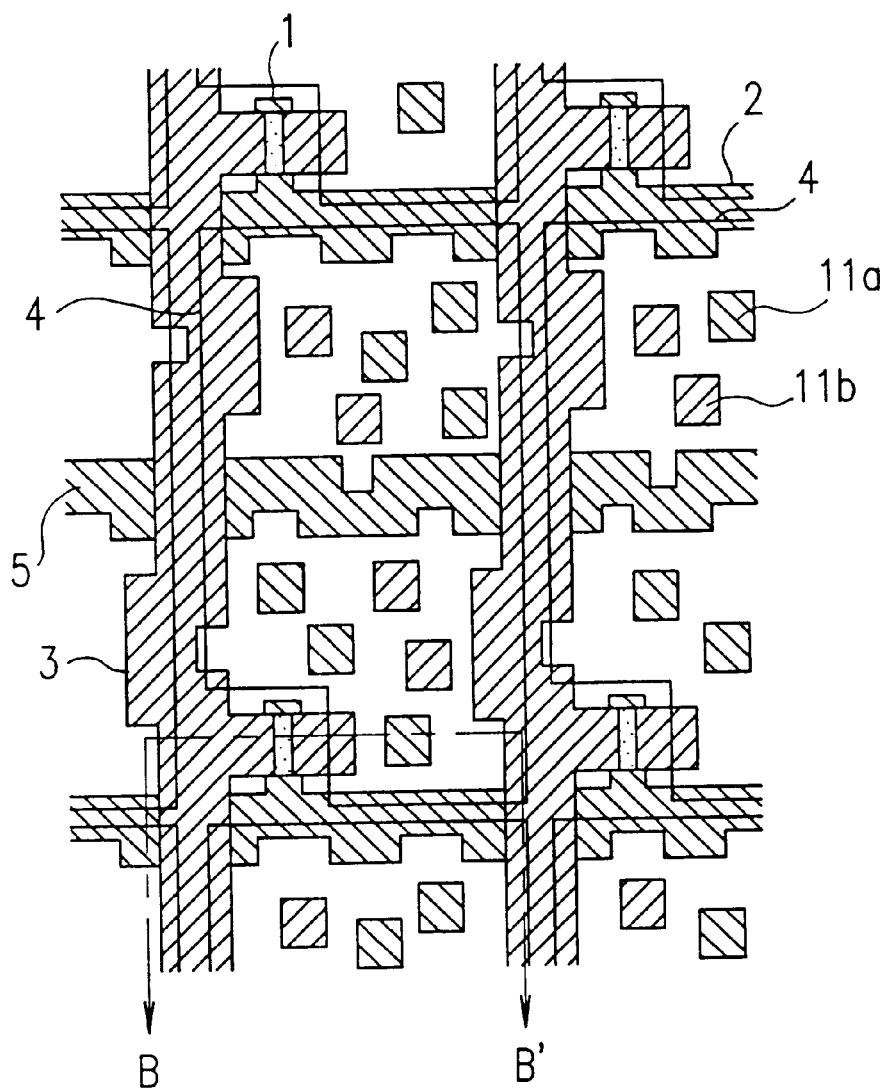
FIG. 3 is a plan view partially showing an active matrix substrate of a liquid crystal display device according to a second example of the present invention.
Figure 4:
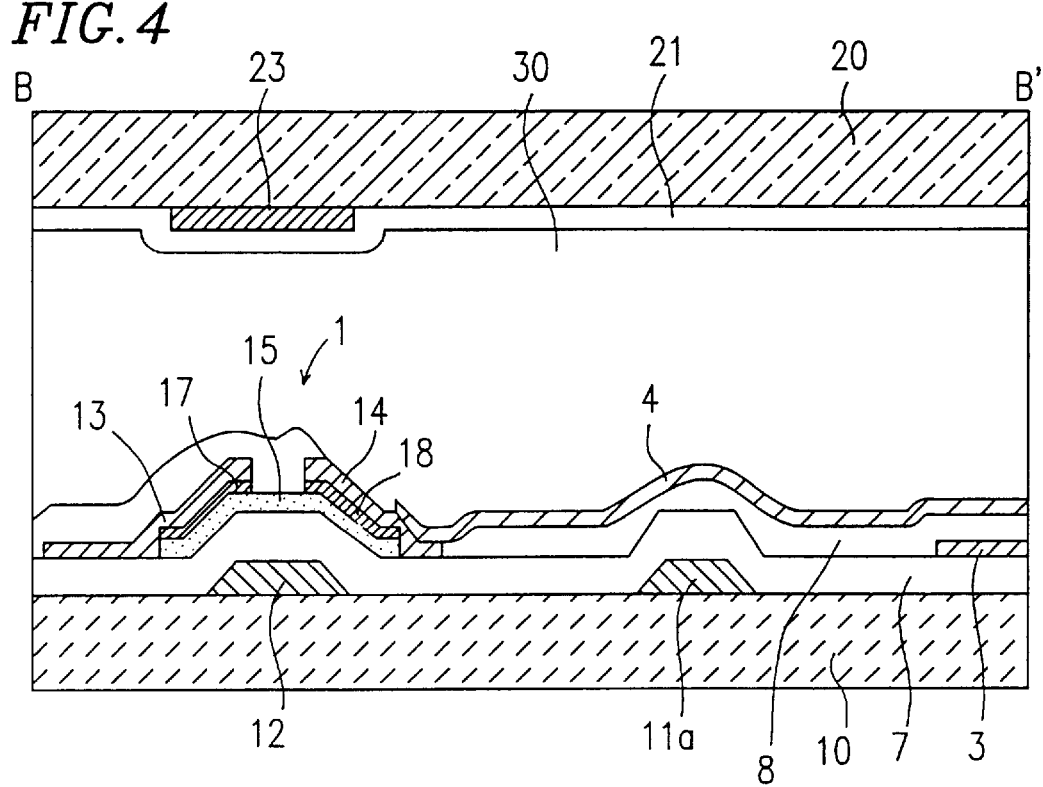
FIG. 4 is a cross-sectional view showing one pixel portion of the liquid crystal display device according to the second example of the present invention taken along line B–B' of FIG. 3.

FIG. 3 is a partial plan view showing one pixel portion of an active matrix of a liquid crystal display device according to a second example of the present invention. FIG. 4 is a cross-sectional view of the liquid crystal display device taken along line B–B' of FIG. 3. Components having like functions and effects are denoted by the same reference numerals as those in FIGS. 1 and 2, and the description thereof is omitted.

According to the second example of the present invention, a surface of a pixel electrode 4 which also serves as a reflective electrode is made uneven so as to eliminate nonuniform wavelength characteristics and minimize the coloring of the light reflected off the reflective electrode caused by other reflected light, i.e., light interference. As a result, an excellent display is obtained and the brightness thereof is enhanced. In the same manner as in the first example of the present invention, the gate line 2 and the source line 3 are provided with bends, notches, protrusions or holes. Accordingly, the contour of the periphery of the pixel electrode 4 (i.e., the reflective electrode) substantially follows the bends, notches, protrusions or holes of the underlying gate lines 2 and source lines 3, and thus is uneven.

An area where the pixel electrode 4 does not overlap with the gate line 2 or the source line 3, i.e, the center portion of the pixel electrode 4, is provided with island-shaped convex portions 11a and 11b which are formed simultaneously with the gate lines 2 and the source lines 3, respectively, by using the same materials. According to the second example of the present invention, the convex portions 11a are made of the same material as that of the gate lines 2 and the convex portions 11b are made of the same material as that of the source lines 3 in order to minimize the nonuniform wavelength characteristics of the reflected light. Since the thicknesses of the gate lines 2 and the source lines 3 are different, convex portions with 2 types of heights are preferably formed. The positions and the shapes of the convex portions 11a and 11b are randomly patterned so that the spaces therebetween and the shapes thereof are preferably not uniform. However, the patterns may be the same throughout every pixel electrode. The convex portions 11a and the convex portions 11b may be alternately positioned so that interference between the adjacent convex portions is prevented.

Hereinafter, a method for producing the liquid crystal display device according to the second example of the present invention will be described. First, the gate lines 2, the gate electrode 12, and the convex portions 11a are formed on a transparent insulative substrate 10 (e.g., a glass substrate) preferably with tantalum, aluminum or the like having a thickness of about 250 to 450 nm, preferably about 350 nm. Then, the gate insulating film 7 is formed preferably with silicon nitride or the like on the substrate 10 with the gate lines 2, the gate electrode 12 and the convex portions 11a, wherein the insulating film 7 has a thickness of about 400 nm by a plasma CVD method. Subsequently, the semiconductor layer 15 preferably made of amorphous silicon (a-Si) or the like and the ohmic contact layer 17 preferably made of microcrystalline n$^+$-type silicon ($\mu$C-n$^+$Si) or the like are formed. Then, the source lines 3, the source electrode 13, the drain electrode 14 and the convex portions 11b are preferably formed with tantalum, aluminum or the like having a thickness of about 200 to 400 nm, preferably about 300 nm by a sputtering method.

Thereafter, a polyimide film is formed as the interlayer insulating film 8, for example, having a thickness of about 0.5 $\mu$m by a spin application method. The viscosity and the thickness of the polyimide film, and the number of rotations for spin application are adjusted such that the interlayer insulating film 8 substantially follows the uneven contour of the underlying gate lines 2, source lines 3 and convex portions 11a and 11b.

In order to attain a smooth uneven surface of the interlayer insulating film 8, the polyimide is melted with heat. The polyimide may be melted by suddenly increasing the temperature of the oven so as to volatilize the solvent, or by setting the temperature of the oven to a temperature higher than a normal curing temperature.

Although not shown in FIGS. 3 and 4, the convex portions 11b made of the same material as the source lines 3 may be formed above the gate lines 2 so as to further minimize the nonuniform wavelength characteristics. Moreover, the convex portions 11a may be formed beneath the source lines 3 so as to make the surface of the source lines 3 uneven. The interlayer insulating film 8 is etched by applying a resist and exposing the resist to a desired pattern, thereby forming the contact holes. If increased unevenness is desired, portions of the interlayer insulating film 8 where none of the gate lines 2, source lines 3 and convex portions 11a and 11b are present should be etched away.

In order to enhance the adhesion between the interlayer insulating film (i.e., polyimide film) and the pixel electrodes 4, ashing which is performed to remove the resist is performed by using the same apparatus for removing the resist so as to provide the interlayer insulating film 8 with a microscopically uneven surface.

Thereafter, a conductive film with high reflectance such as, for example, an aluminum film is formed as the pixel electrodes 4 having a thickness of about 100 nm by a sputtering method. The pixel electrode 4 is connected to the drain electrode 14 of the TFT 1 via the contact hole provided through the interlayer insulating film 8. At this step, a light shielding film made of the same material as the pixel electrode 4 may be formed on the TFT 1 so as to prevent light leakage to the TFT 1. Lastly, the alignment film (not shown) is formed. Consequently, the active matrix substrate according to the second example of the present invention is produced.

The counter substrate is formed as follows. First, a light shielding film 23 for preventing the light leakage to the TFT 1 is formed on a transparent insulative substrate 20, and then a transparent conductive film (e.g., ITO) is formed as a counter electrode 21. Thus, an alignment film (not shown) is formed on the resultant structure. At this point, color filters may be provided as may be desired.

The thus-obtained active matrix substrate and the thus-obtained counter substrate are disposed in an opposing manner with a liquid crystal material 30 sealed therebetween, thereby forming the liquid crystal display device according to the second example of the present invention.

According to the second example of the present invention, the maximum width of the gate lines 2 and the Cs lines 5 is about 20 µm, and notches with two lengths (about 10 µm and about 5 µm) are provided. As shown in FIG. 3, the Cs line 5 is alternately provided with the notches on both sides along the length thereof, thereby obtaining the bent-like Cs line 5. Each gate line 2 overlaps for larger area with the pixel electrodes 4 in the next row (i.e., the pixel electrodes 4 shown below the gate line 2 in FIG. 3) than with the pixel electrodes 4 which are actually driven by the gate lines 2 (i.e., the pixel electrodes 4 shown above the gate line 2 in FIG. 3), and notches are provided on one side of the gate line 2 opposite to the TFTs 1. The source lines 3 are provided with notches so as to have bent-shapes with a substantially constant width of 10 µm. The widths of the convex portions 11a and 11b which are provided where the pixel electrodes and the lines 2 and 3 are not overlapped with each other are made about 10 µm. Alternatively, the widths of the convex portions 11a and 11b may be varied (e.g., about 5 µm and about 10 µm) so as to minimize the nonuniform wavelength characteristics caused by light interference. Furthermore, instead of rectangles, the convex portions 11a and 11b may be rhombuses, crosses, polygons such as triangles or hexagons, circles, ovals or any kind of curved structure.

According to the second example of the present invention, since the thicknesses of the gate lines 2 and the source lines 3 are different, the convex portions 11a and 11b with two different heights are formed. Accordingly, the nonuniform wavelength characteristics are minimized. In other words, by combining the materials for the lines having different sizes and the heights, various convex portions may be formed. Accordingly, coloring of the light reflected off the reflective electrodes due to light interference is minimized. As a result, not only is an excellent display obtained but also the brightness of the display is enhanced.

EXAMPLE 3

Figure 5:
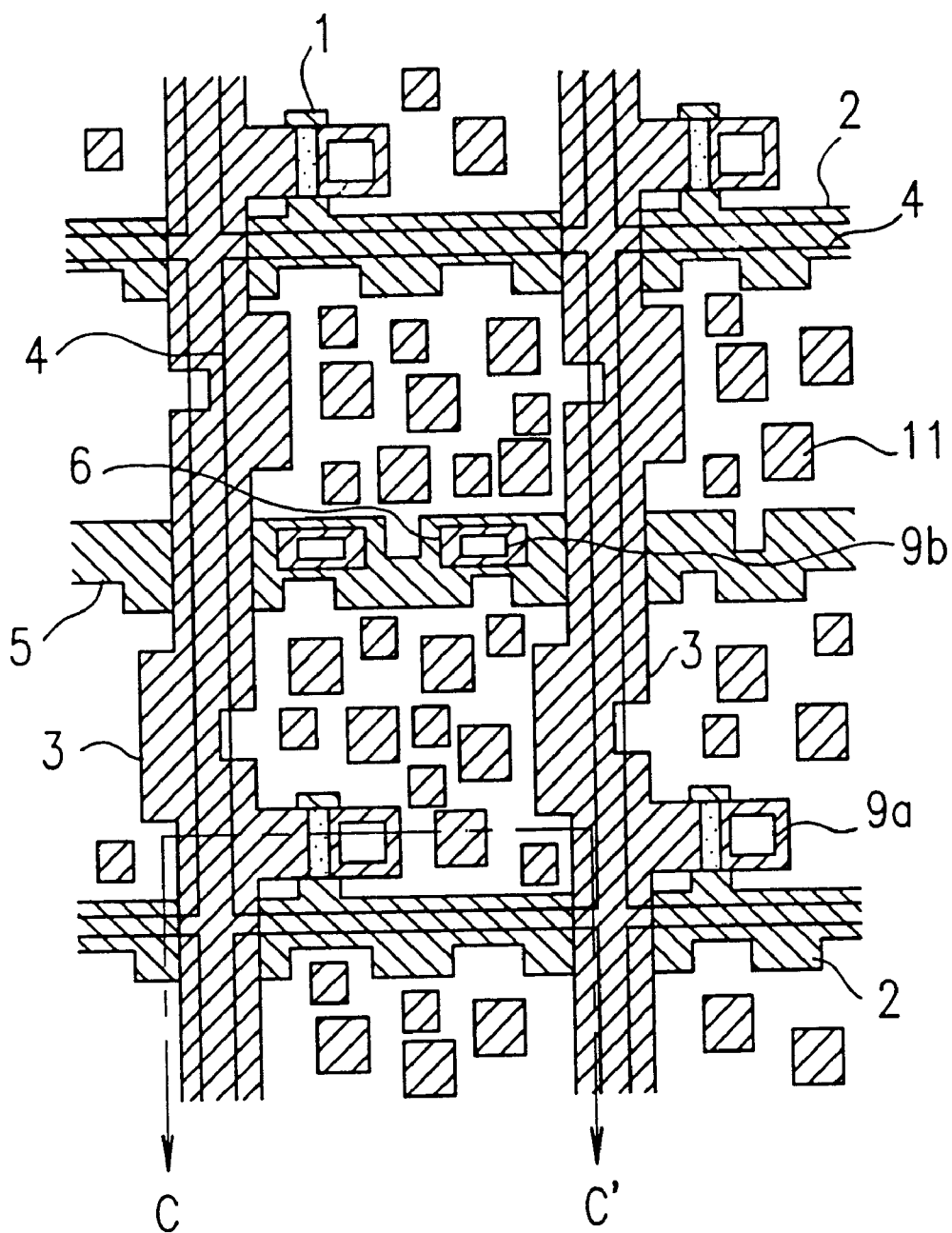
FIG. 5 is a plan view partially showing an active matrix substrate of a liquid crystal display device according to a third example of the present invention.
Figure 6:
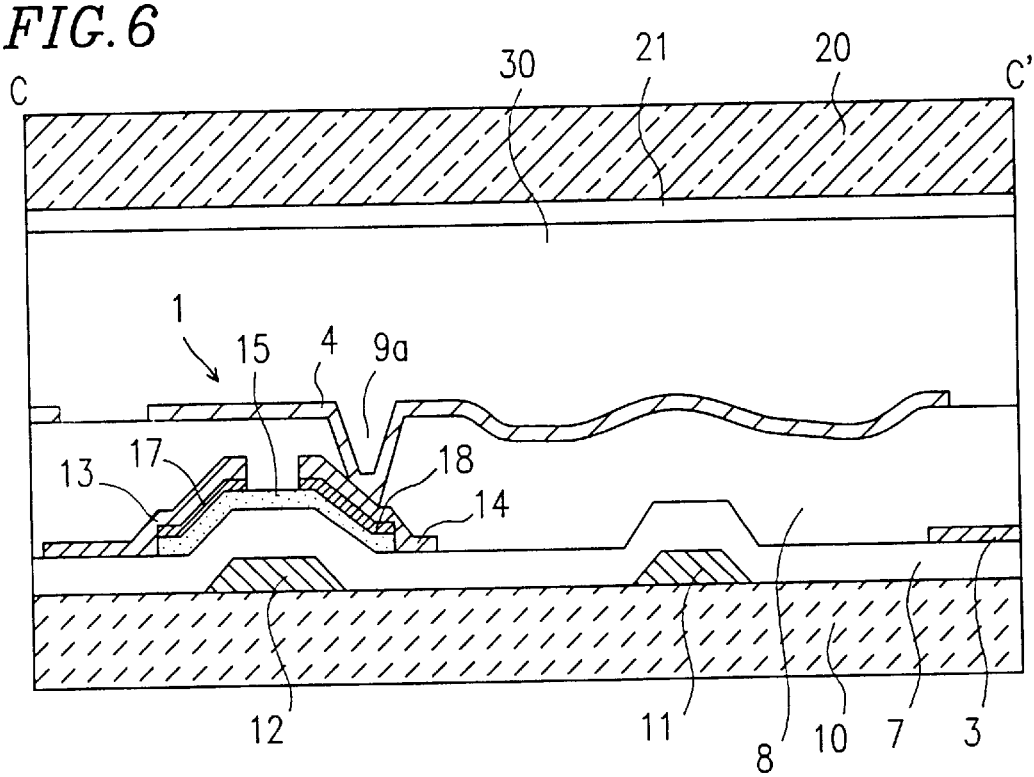
FIG. 6 is a cross-sectional view showing one pixel portion of the liquid crystal display device according to the third example of the present invention taken along line C–C' of FIG. 5.
Figure 7:
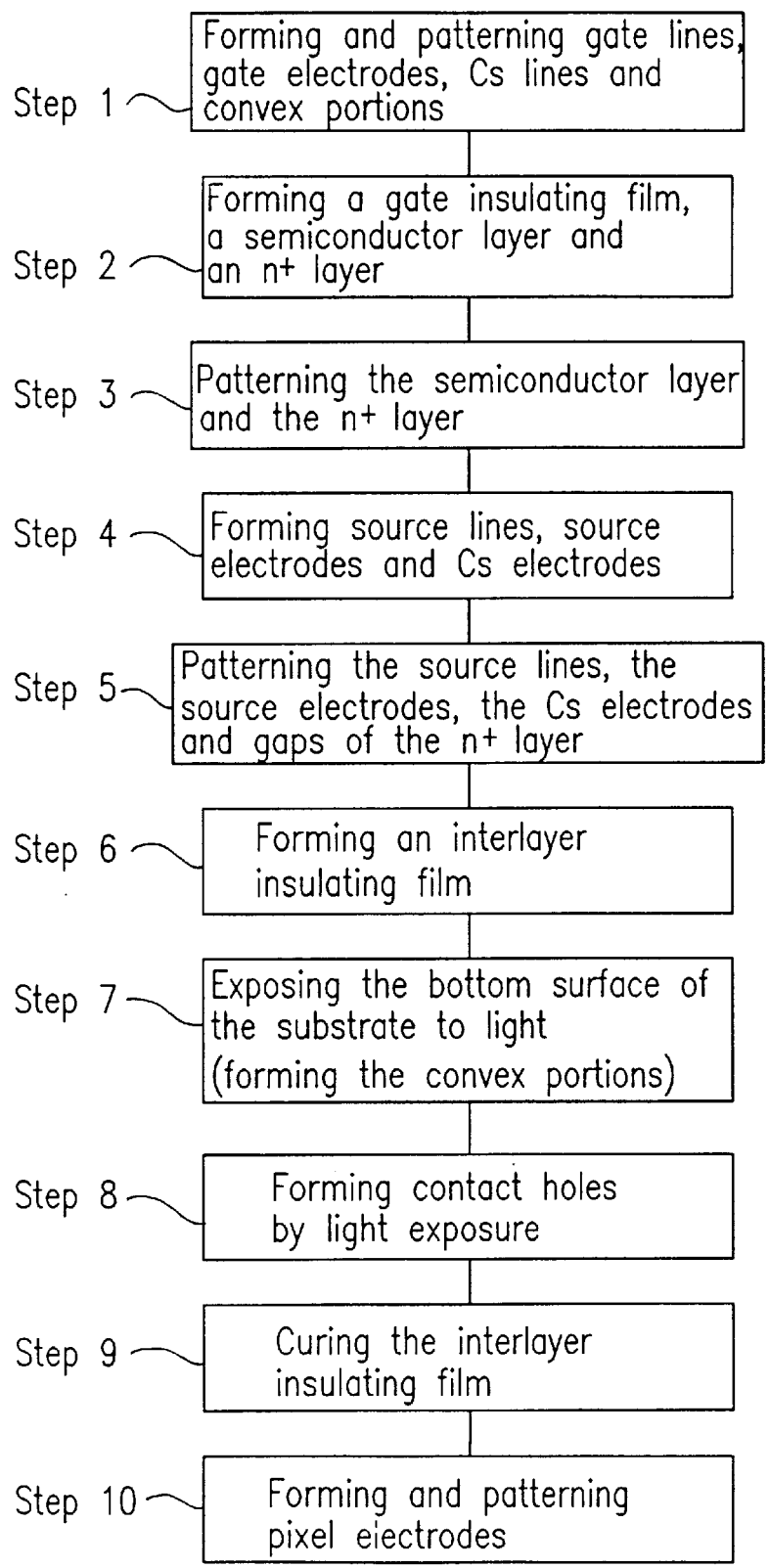
FIG. 7 is a flow chart showing the steps of producing the liquid crystal display device according to the third example of the present invention.

FIG. 5 is a partial plan view showing an active matrix substrate of a liquid crystal display device according to a third example of the present invention. FIG. 6 is a cross-sectional view showing one pixel portion of the liquid crystal display device taken along line C–C' of FIG. 5. FIG. 7 is a flow chart showing the steps for producing the liquid crystal display device according to the third example of the present invention. Components having like functions and effects are denoted by the same reference numerals as those in FIGS. 1 through 4, and the description thereof is omitted.

According to the third example of the present invention, a photosensitive acrylic resin is formed as an interlayer insulating film 8 having a thickness of about 1 to 10 µm, preferably about 3 µm. The surface of the interlayer insulating film 8 is made flat by forming the interlayer insulating film 8 sufficiently thick to make the unevenness of the underlying gate lines 2 and the source lines 3 negligible. Then, the bottom surface of the substrate 10 is exposed to light for making the surface of the interlayer insulating film 8 uneven, while using the gate lines 2, the source lines 3 and the convex portions 11 as masks.

Hereinafter, a method for producing the liquid crystal display device according to the third example of the present invention will be described with reference to FIG. 7.

First, the gate lines 2, the gate electrodes 12 and the convex portions 11a and 11b are formed on a transparent insulative substrate 10 made of, for example, glass (Step 1). Next, a gate insulating film 7, a semiconductor layer 15 and a layer for the ohmic contact layers 17 and 18 are sequentially deposited on the substrate 10 (Step 2). Thereafter, the semiconductor layer 15 and the layer for the ohmic contact layers 17 and 18 are each patterned into an island-shape (Step 3). Then, the source lines 3, source electrodes 13 and drain electrodes 14 are deposited (Step 4) and patterned (Step 5). At this point, the gap of the layer for the ohmic contact layers 17 and 18 ($n^+$ layer) is simultaneously formed.

A photosensitive acrylic resin as the interlayer insulating film 8 is formed on the thus-obtained layer structure having a thickness of, for example, 3 µm by a spin application method (Step 6). The bottom surface of the substrate 10 is exposed to light for patterning the photosensitive acrylic resin while using the gate lines 2, the source lines 3 and the convex portions 11 as masks (Step 7). According to the third example of the present invention, a positive-type photosensitive resin is used. Thus, portions of the interlayer insulating film 8 shielded with the masks (i.e., the gate lines 2, the source lines 3 and the convex portions 11) remain and portions of the interlayer insulating film 8 not shielded with the masks are removed.

The interlayer insulating film 8 is further exposed to light according to a desired pattern, developed with an alkali solution and cured with heat so as to provide contact holes 9a and 9b therethrough. The surface of the interlayer insulating film 8 may be melted with heat so as to obtain a smooth uneven surface of the interlayer insulating film 8. Due to such a structure, a leakage failure between the pixel electrodes 4 and the gate lines 2 or the source lines 3 is prevented. More-over, since the parasitic capacitance between the pixel electrodes 4 and the gate lines 2 or the source lines 3 is reduced, deterioration of the display quality caused, for example, by cross-talk due to the parasitic capacitance is prevented.

Thereafter, a conductive film with high reflectance (e.g., an aluminum film) is formed as the pixel electrodes 4 having a thickness of about 100 nm by a sputtering method. The pixel electrode 4 is connected to the drain electrode 14 of the TFT 1 via the contact hole provided through the interlayer insulating film 8. In this step, a light shielding film made of the same material as the pixel electrode 4 may be formed on the TFTs 1 to prevent leakage of light to the TFTs 1. Lastly, an alignment film (not shown) is formed. In this manner, the active matrix substrate according to the third example of the present invention is produced.

A counter substrate is obtained by forming a transparent conductive film (e.g., ITO) as a counter electrode 21 on a transparent insulating substrate 20 and by forming an alignment film thereon.

The thus-obtained active matrix substrate and the thus-obtained counter substrate are disposed in an opposing manner with a liquid crystal material 30 sealed therebetween.

According to the third example of the present invention, since the thick interlayer insulating film 8 is provided between the pixel electrodes 4 and the gate lines 2 or the source lines 3, the pixel electrodes 4 may overlap the gate lines 2 or the source lines 3 for a larger area. Consequently, a bright display is obtained. Moreover, by extending the pixel electrode 4 over the TFTs 1, the pixel electrode 4 serves as a light shielding film for the TFTs 1.

EXAMPLE 4

Figure 8:
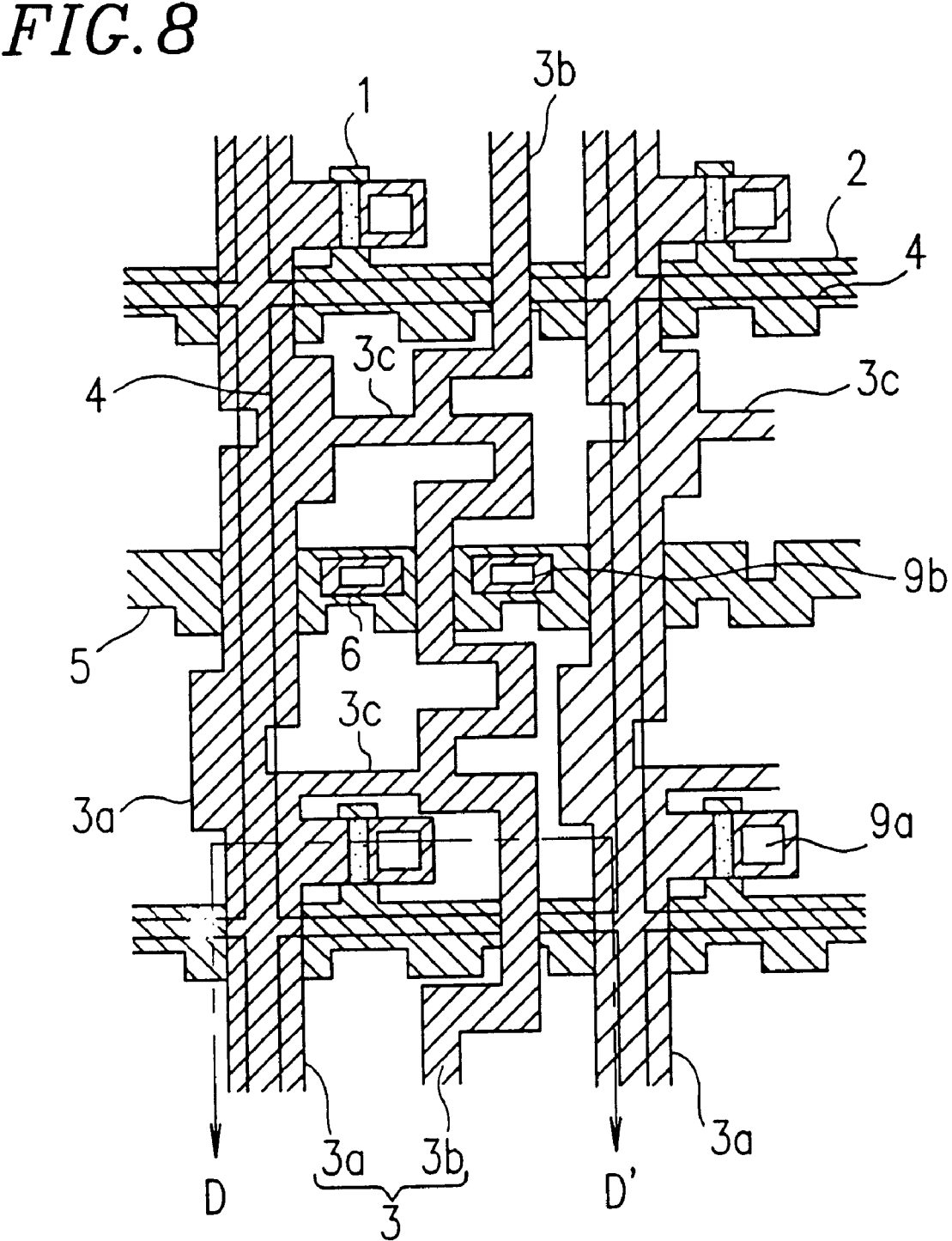
FIG. 8 is a plan view partially showing an active matrix substrate of a liquid crystal display device according to a fourth example of the present invention.
Figure 9:
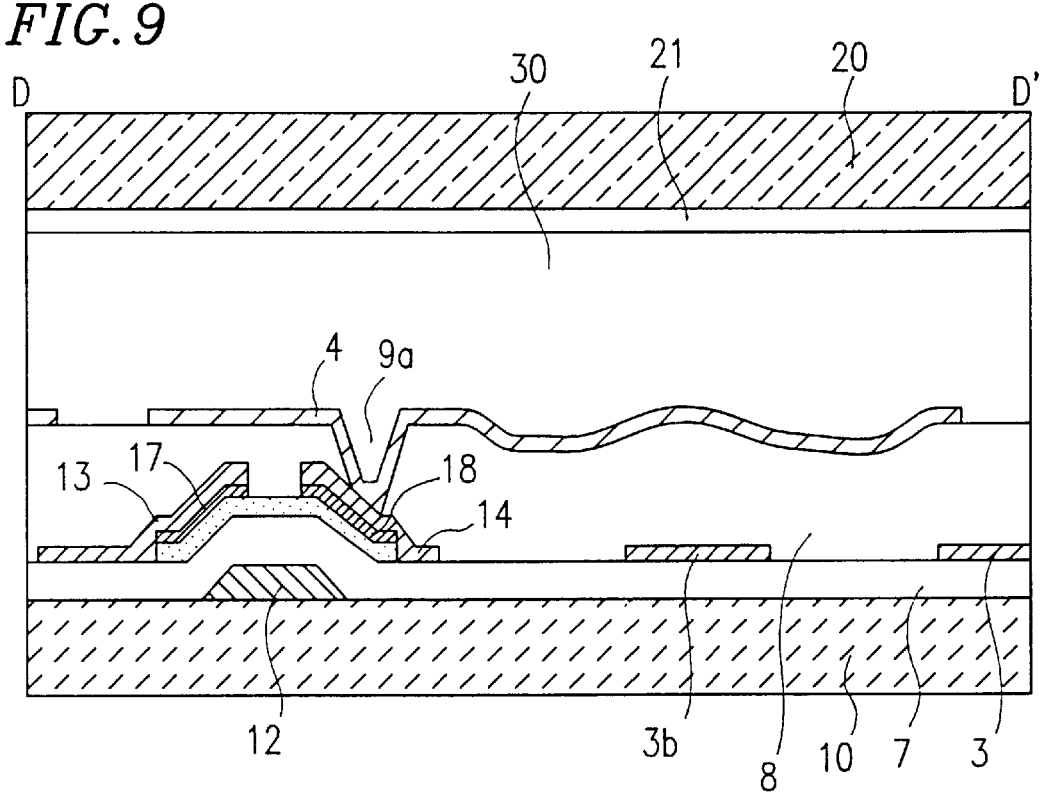
FIG. 9 is a cross-sectional view showing one pixel portion of the liquid crystal display device according to the fourth example of the present invention taken along line D–D' of FIG. 8.

FIG. 8 is a partial plan view showing an active matrix substrate of a liquid crystal display device according to a fourth example of the present invention. FIG. 9 is a cross-sectional view showing one pixel portion of the liquid crystal display device taken along line D–D' of FIG. 8. Components having like functions and effects are denoted by the same reference numerals as those in FIGS. 1 through 6, and the description thereof is omitted.

According to the fourth example of the present invention, each source line 3 consists of a main source line 3a and a sub-source line 3b which are connected to each other via a plurality of connection lines 3c. The main source lines 3a and the sub-source lines 3b may be simultaneously formed during the same manufacturing step. The main source lines 3a and the sub-source lines 3b are bent to have different shapes. Instead of bending, notches, protrusions or holes may be formed. Such a structure minimizes the discontinuity rate of the source lines 3. A discontinuity in the main source line 3a may be compensated by using the sub-source line 3b for bypassing, thereby improving the production rate of satisfactory products. The above-described structure may also be applied to the gate lines 2.

According to the fourth example of the present invention, in the same manner as in the third example, the surface of the pixel electrodes 4 are made uneven by exposing the bottom surface of the photosensitive acrylic resin (an interlayer insulating film 8) to light while using the gate lines 2, the main source lines 3a and the sub-source lines 3b as masks. Alternatively, a thin polyimide film may be formed as an interlayer insulating film 8 having a thickness of about 0.5 μm so as to substantially follow the uneven shapes of the underlying gate lines 2, main source lines 3a and sub-source lines 3b. Therefore, it is possible to obtain an uneven surface only by using the gate lines 2 and the source lines 3.

EXAMPLE 5

Figure 10:
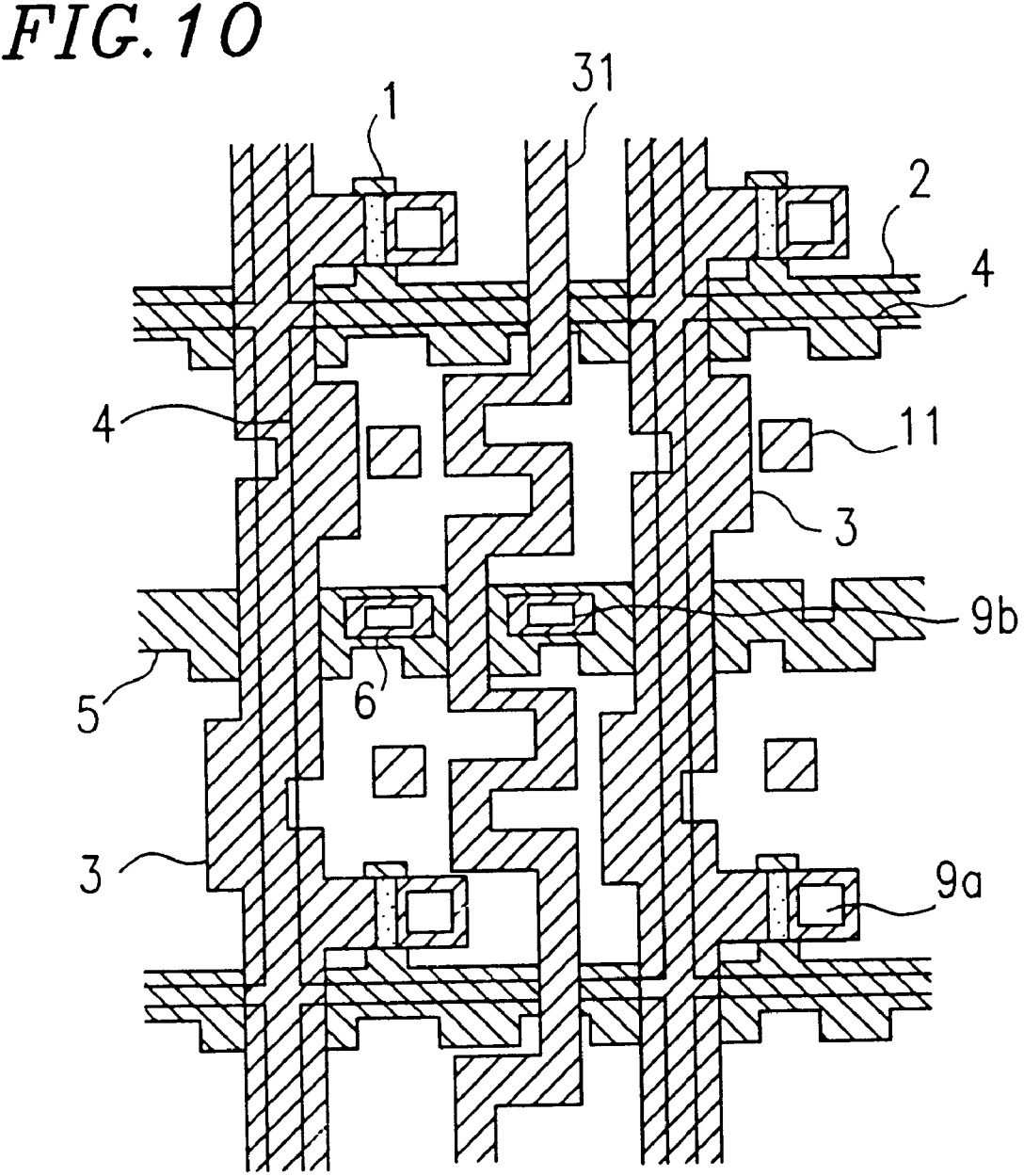
FIG. 10 is a plan view partially showing an active matrix substrate of a liquid crystal display device according to a fifth example of the present invention.

FIG. 10 is a partial plan view of an active matrix of a liquid crystal display device according to a fifth example of the present invention. Components having like functions and effects are denoted by the same reference numerals as those shown in FIGS. 1 through 6, 8 and 9, and the description thereof is omitted.

According to the fifth example of the present invention, lines 31 are provided parallel to the source lines 3, where signals having a reversed polarity to a polarity of source signals are input (hereinafter, referred to as "reversed polarity lines 31"). By providing the reversed polarity lines 31, the signals leaking from the source lines 3 to the pixel electrodes 4 via the parasitic capacitance are cancelled.

Specifically, the signals of the reversed polarity lines 31 are made to be reversed with respect to the waveform of the signals of the source lines 3. In the case where the overlapping areas of the pixel electrodes 4 and the source lines 3 are equal to the overlapping areas of the pixel electrodes 4 and the reversed polarity lines 31, the signals of the reversed polarity lines 31 are reversed with respect to the waveform of the signals of the source lines 3. In the case where the overlapping areas of the pixel electrodes 4 and the source lines 3 are not equal to the overlapping areas of the pixel electrodes 4 and the reversed polarity lines 31, the signals of the reversed polarity lines 31 are altered so that the signals leaking from the reversed polarity lines 31 to the pixel electrodes 4 have the same amplitude as the signals leaking from the source lines 3 to the pixel electrodes 4 (however, the waveforms are reversed) by multiplying the amplitude of the signal of the source lines 3 by a constant corresponding to the difference between the overlapping areas. As a result, the deterioration of the display quality caused, for example, by cross-talk due to the parasitic capacitance between the source lines 3 and the pixel electrodes 4 is prevented, thereby forming a reflective liquid crystal display device with high display quality.

According to the fifth example of the present invention, in the same manner as in the fourth example of the present invention, the surfaces of the pixel electrodes 4 are made uneven by following the uneven shapes of the underlying gate lines 2, source lines 3 and reversed polarity lines 31.

EXAMPLE 6

Figure 11:
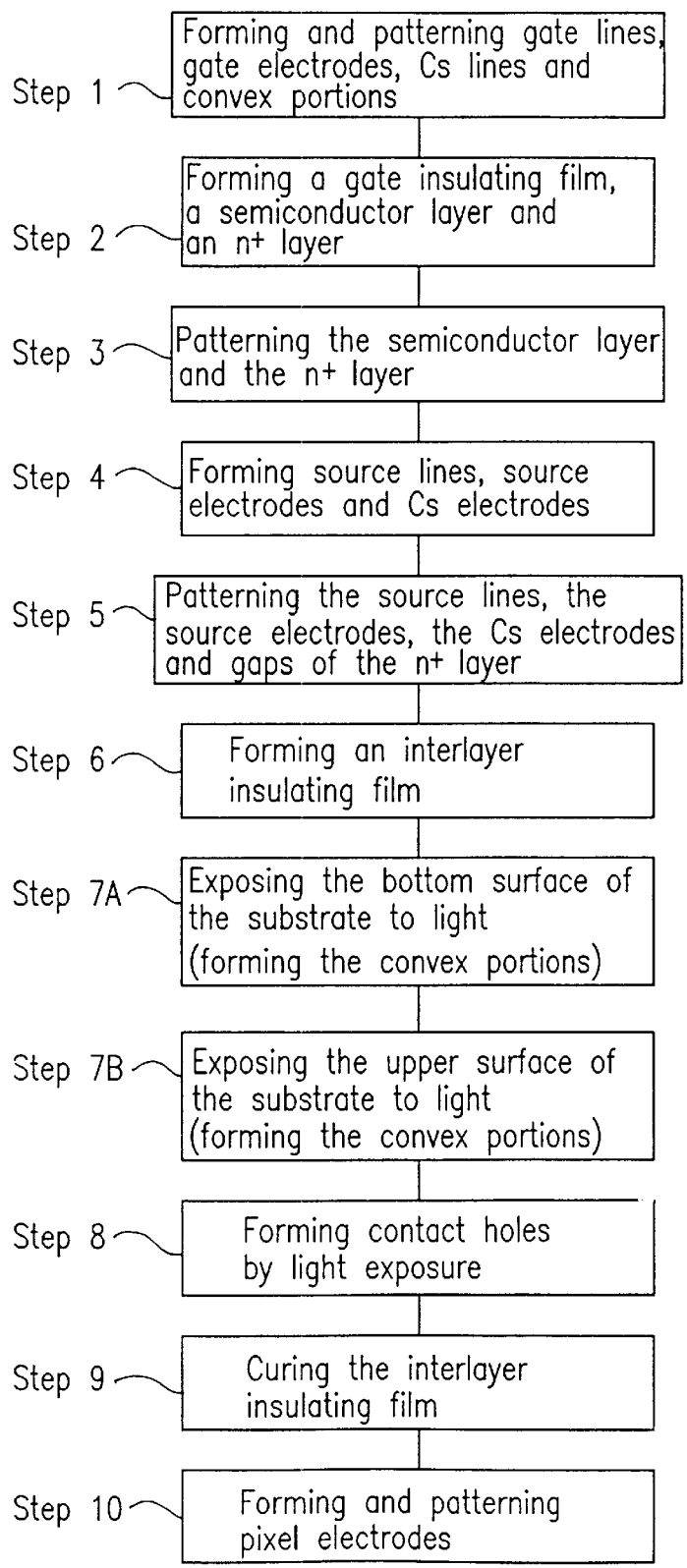
FIG. 11 is a flow chart showing the steps of producing the liquid crystal display device according to the sixth example of the present invention.
Figure 12:
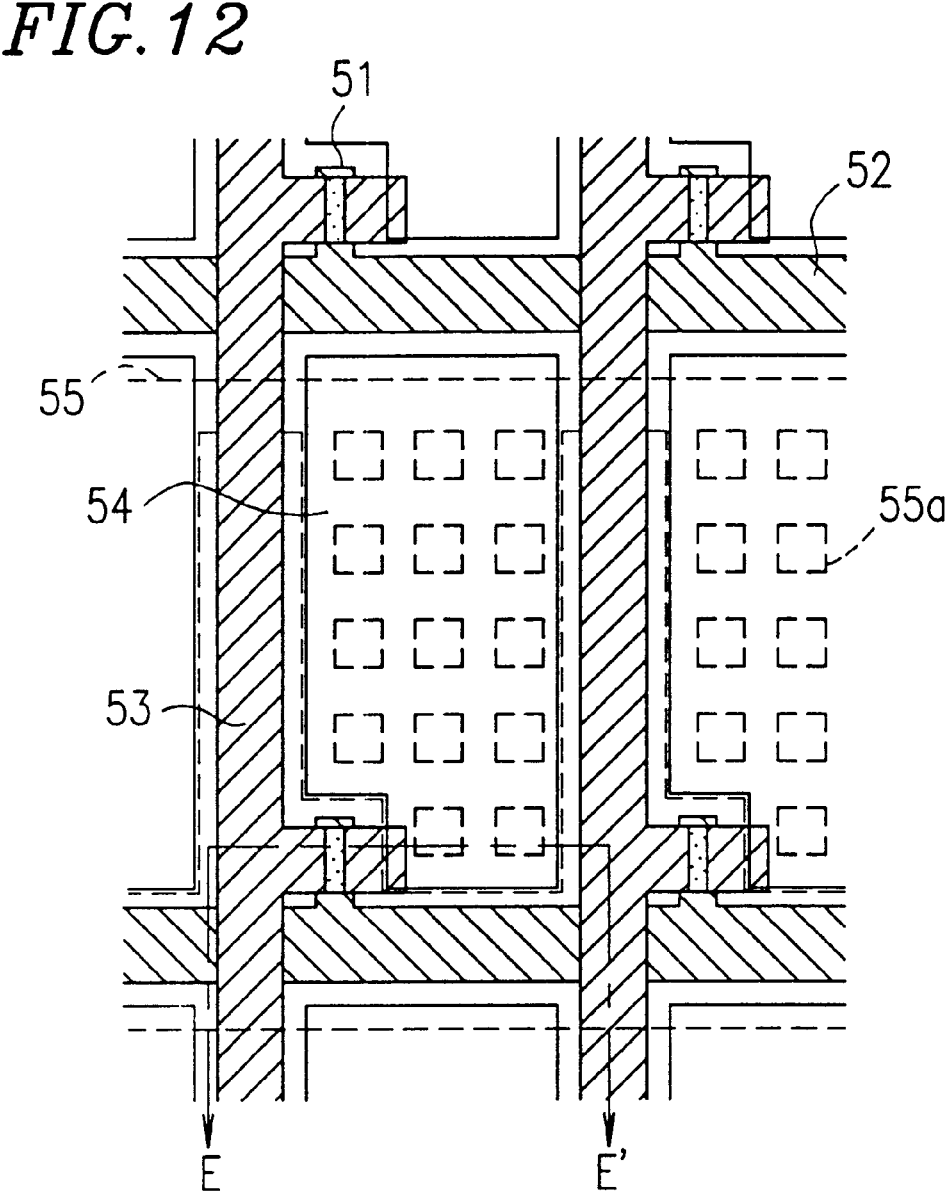
FIG. 12 is a plan view partially showing an active matrix substrate of a conventional liquid crystal display device.
Figure 13:
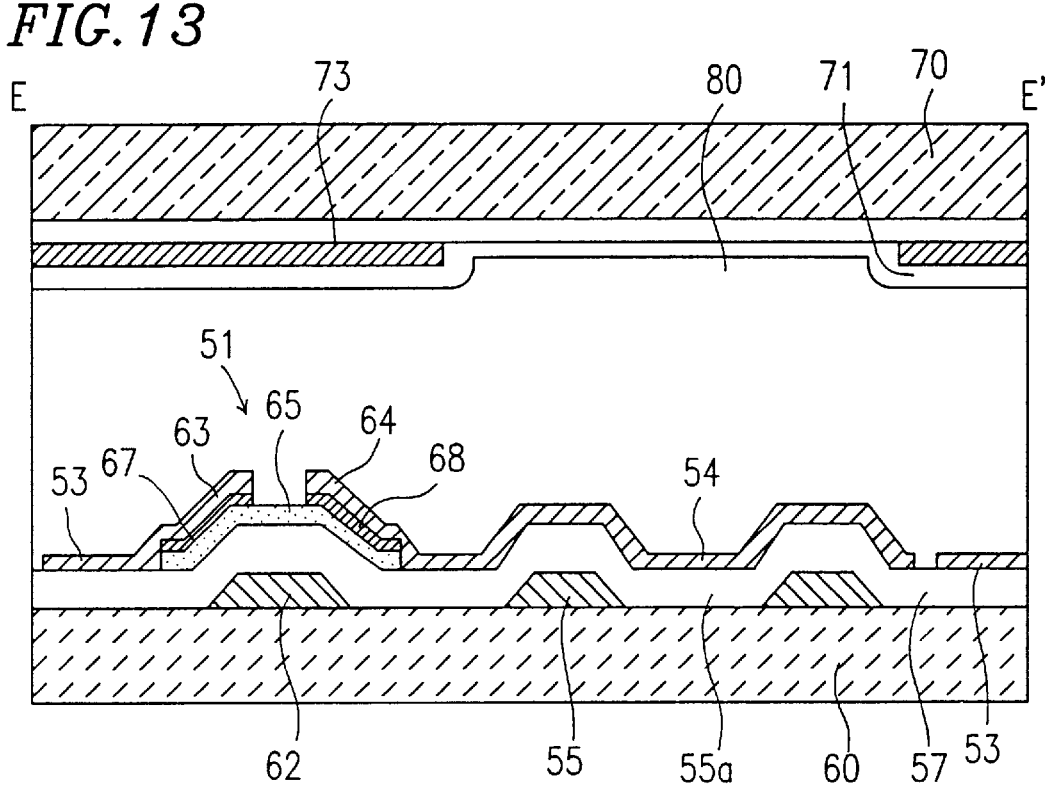
FIG. 13 is a cross-sectional view showing the conventional liquid crystal display device taken along line E–E' of FIG. 12.

FIG. 11 is a chart showing the steps for producing a liquid crystal display device according to a sixth example of the present invention. The process for producing the liquid crystal display device according to the sixth example of the present invention is substantially the same as that according to the third example of the present invention, except for Step 7B, and the descriptions for the same steps are omitted. Step 7A is substantially the same as Step 7 according to the third example of the present invention.

According to the third and the fourth examples of the present invention, the uneven surfaces are provided by exposing the bottom surface of the substrate to light, and, basically, convex portions having substantially the same height are formed.

According to the sixth example of the present invention, in order to eliminate the nonuniform wavelength characteristics, the first exposure at Step 7A is performed by subjecting the bottom surface of the substrate to light while using the lines and the convex portions as masks, and the second exposure at Step 7B is conducted while using different masks. In such a manner, convex portions having two different heights are formed only by adding one step, i.e., Step 7B.

The exposures of Steps 7B and 8 are common in that the upper surface of the substrate is exposed to the light. However, the amount of the exposures of Step 7B and Step 8 are different and thus cannot be performed together.

In order to perform Steps 7B and 8 together, the conductive film or the like beneath the contact holes should be transparent so that the contact holes may be provided by the exposures in Steps 7A and 8. Accordingly, Steps 7B can be omitted. The transparent conductive film beneath the contact holes may be made from an $n^+$ layer so that an additional step is not required.

A reflective liquid crystal display device according to the present invention includes: a plurality of scanning lines; a plurality of signal lines disposed so as to intersect with the plurality of scanning lines; a plurality of pixel electrodes which also serve as reflective plates and which overlap at least one of the scanning lines and the signal lines via an interlayer insulating film; and a plurality of switching elements for driving the pixel electrodes, each provided in a vicinity of the intersection of the scanning lines and the signal lines. At least one of the scanning lines or the signal lines have at least one of bends, notches, protrusions and holes. Accordingly, the parasitic capacitance between the lines and the pixels is reduced, thereby preventing deterioration of the display quality caused by, for example, crosstalk. By randomly patterning the signal lines, the parasitic capacitance caused between the signal lines and the pixel electrodes may be slightly different for each pixel. Thus, display unevenness caused by the offset of blocks for stepper exposures is prevented. Moreover, the nonuniform wavelength characteristics at the periphery of the pixel electrodes are minimized, thereby eliminating the influence of the light interference.

According to the present invention, the notches of at least one of the scanning lines or the signal lines are provided in an asymmetric manner with respect to a center line along a length of each of the scanning lines or the signal lines. Accordingly, the widths of the scanning lines and the widths of the signal lines are maintained sufficiently wide for preventing discontinuities in the scanning lines and the signal lines.

According to the present invention, parasitic capacitance between each of the scanning lines and each of the pixel electrodes is substantially constant. Accordingly, a direct-current component applied to the liquid crystal material is minimized, thereby enhancing the display quality and the reliability of the liquid crystal display device.

A method for producing a reflective liquid crystal display device according to the present invention includes: a plurality of scanning lines; a plurality of signal lines disposed so as to intersect with the plurality of scanning lines; a plurality of pixel electrodes which also serve as reflective plates and which overlap at least one of the scanning lines and the signal lines via an interlayer insulating film; and a plurality of switching elements for driving the pixel electrodes, each provided in a vicinity of the intersection of the scanning lines and the signal lines. The method includes a step of providing at least one of bends, notches, protrusions and holes to at least one of the scanning lines and the signal lines so as to make the surfaces of the pixel electrodes overlapping at least one of the scanning lines and the signal lines uneven. Accordingly, a reflective liquid crystal display device having a bright display and sufficiently uniform wavelength characteristics at the periphery of the pixels is formed without increasing the number of production steps.

According to the present invention, the surfaces of the pixel electrodes are made uneven by the interlayer insulating film which is exposed to light while using the scanning lines and the signal lines as masks. Accordingly, a thick interlayer insulating film is formed between the pixel electrodes and the scanning lines or the signal lines, thereby minimizing the parasitic capacitance therebetween.

According to the present invention, the interlayer insulating film is made of a positive type photosensitive resin. Accordingly, the scanning lines and the signal lines act as light shielding films so as to leave the interlayer insulating film on the scanning lines and the signal lines after light exposure. Thus, a sufficient amount of the interlayer insulating film will remain between the pixel electrodes and the scanning lines or the signal lines, thereby reducing the parasitic capacitance therebetween and minimizing leakage failure.

In areas where the pixel electrodes do not overlap with the scanning lines or the signal lines, portions made of the same materials for forming the scanning lines and the signal lines are provided randomly, on which the interlayer insulating film is formed. As a result, the interlayer insulating film follows the contours of these portions. Thus, the surface of the interlayer insulating film is made uneven without different materials disturbing each other.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflective liquid crystal display device, comprising:
    a plurality of address lines including a plurality of scanning lines and a plurality of signal lines the signal lines disposed so as to intersect with corresponding scanning lines;
    a plurality of pixel electrodes which also serve as reflective plates and each of which overlaps at least one of the address lines via an interlayer insulating film; and
    a plurality of switching elements for driving the pixel electrodes, each switching element provided in a vicinity of an intersection of one of the scanning line and one of the signal lines,
    wherein at least one of the address lines has at least one of bends, notches, protrusions and holes formed therein in locations so as to reduce area where pixel electrodes overlap the at least one address line so as to minimize parasitic capacitance.

2. A reflective liquid crystal display device according to claim 1, wherein a parasitic capacitance between each of the scanning lines and each of the pixel electrodes is relatively constant.

3. A reflective liquid crystal display device, comprising:
    a plurality of address lines including a plurality of scanning lines and a plurality of signal lines the signal lines disposed so as to intersect with corresponding scanning lines;
    a plurality of pixel electrodes which also serve as reflective plates and each of which overlaps at least one of the address lines via an interlayer insulating film;
    a plurality of switching elements for driving the pixel electrodes, each switching element provided in a vicinity of an intersection of one of the scanning line and one of the signal lines,
    wherein at least one of the address lines has at least one of bends, notches, protrusions, and holes; and
    wherein notches of at least one of the address lines are provided in an asymmetric manner with respect to a center line along a length of the at least one address line.

4. A reflective liquid crystal display device, comprising:
    a plurality of address lines including a plurality of scanning lines and a plurality of signal lines the signal lines disposed so as to intersect with corresponding scanning lines;
    a plurality of pixel electrodes which also serve as reflective plates and each of which overlaps at least one of the address lines via an interlayer insulating film;
    a plurality of switching elements for driving the pixel electrodes, each switching element provided in a vicinity of an intersection of one of the scanning line and one of the signal lines,
    wherein at least one of the address lines has at least one of bends, notches, protrusions, and holes; and
    wherein island-shaped portions made of at least one of the materials used for the scanning lines or the signal lines are provided in areas where the scanning lines or the signal lines do not overlap the pixel electrodes.

5. A reflective liquid crystal display device, comprising:
    a plurality of address lines including, a plurality of scanning lines and a plurality of signal lines the signal lines disposed so as to intersect with corresponding scanning lines;

a plurality of pixel electrodes which also serve as reflective plates and each of which overlaps at least one of the address lines via an interlayer insulating film;

a plurality of switching elements for driving the pixel electrodes, each switching element provided in a vicinity of an intersection of one of the scanning line and one of the signal lines, wherein at least one of the address lines has at least one of bends, notches, protrusions and holes; and wherein at least one of the scanning lines and the signal lines include a main line and a sub-line which are parallel and connected to each other, and the main line or the sub-line has at least one of bends, notches, protrusions or holes.

6. A method for producing a reflective liquid crystal display device comprising: a plurality of address lines including a plurality of scanning lines and a plurality of signal lines, the signal lines disposed so as to intersect with corresponding scanning lines; a plurality of pixel electrodes which also serve as reflective plates and each of which overlaps at least one scanning line or signal line via an interlayer insulating film; and a plurality of switching elements for driving the pixel electrodes, each switching element provided in a vicinity of an intersection of one of the scanning lines and one of the signal lines, the method comprising providing at least one of bends, notches, protrusions and holes in at least one of the address lines so as to make the surface of a pixel electrode overlapping the at least one address line uneven, and wherein the at least one of bends, notches, protrusions, and holes are formed in order to reduce area where the pixel electrode overlaps the at least one address line so as to minimize parasitic capacitance.

7. A method for producing a reflective liquid crystal display device according to claim 6, wherein the interlayer insulating film is made of a positive type photosensitive resin.

8. A method for producing a reflective liquid crystal display device comprising a plurality of address lines including a plurality of scanning lines and a plurality of signal lines, the signal lines disposed so as to intersect with corresponding scanning lines; a plurality of pixel electrodes which also serve as reflective plates and each of which overlaps at least one scanning line or signal line via an interlayer insulating film; and a plurality of switching elements for driving the pixel electrodes, each switching element provided in a vicinity of an intersection of one of the scanning lines and one of the signal lines, the method comprising providing at least one of bends, notches, protrusions and holes in at least one of the address lines so as to make the surface of a pixel electrode overlapping the at least one address line uneven, and wherein surfaces of the pixel electrodes are made uneven by the interlayer insulating film which is exposed to light while using the scanning lines and the signal lines as masks.

9. A method for producing, a reflective liquid crystal display device comprising a plurality of address lines including a plurality of scanning lines and a plurality of signal lines, the signal lines disposed so as to intersect with corresponding scanning lines; a plurality of pixel electrodes which also serve as reflective plates and each of which overlaps at least one scanning line or signal line via an interlayer insulating film; and a plurality of switching elements for driving the pixel electrodes, each switching element provided in a vicinity of an intersection of one of the scanning lines and one of the signal lines, the method comprising, providing at least one of bends, notches, protrusions and holes in at least one of the address lines so as to make the surface of a pixel electrode overlapping the at least one address line uneven, and wherein island-shaped portions made of at least one of the materials used for the scanning lines or the signal lines are provided in areas where the scanning lines or the signal lines do not overlap the pixel electrodes.

10. A method for producing a reflective liquid crystal display device comprising a plurality of address lines including a plurality of scanning lines and a plurality of signal lines, the signal lines disposed so as to intersect with corresponding scanning lines; a plurality of pixel electrodes which also serve as reflective plates and each of which overlaps at least one scanning line or signal line via an interlayer insulating film; and a plurality of switching elements for driving the pixel electrodes, each switching element provided in a vicinity of an intersection of one of the scanning lines and one of the signal lines, and wherein:

the method comprises reducing a surface area of at least one address line while not reducing a width of said address line at a portion thereof, in a manner so as to reduce an area where pixel electrodes overlap the at least one address line in order to reduce or minimize parasitic capacitance.

* * * * *